July 2, 1957  G. KRAHL ET AL  2,798,123

ELECTRIC CURRENT PULSING APPARATUS

Filed March 16, 1955

Inventors:
Gottfried Krahl
&
Hellmuth Böhm ited States Patent Office 2,798,123
Patented July 2, 1957

2,798,123

ELECTRIC CURRENT PULSING APPARATUS

Gottfried Krahl, Berlin-Schmargendorf, and Hellmuth Böhm, Berlin-Charlottenburg, Germany, assignors to Licentia Patent-Verwaltungs, G. m. b. H., Hamburg, Germany Application March 16, 1955, Serial No. 494,732

Claims priority, application Germany March 20, 1954

10 Claims. (Cl. 200—32)

Electric converters have been known which can operate as rectifiers as well as inverters. In these apparatus, a centrifugal pump throws liquid jets, for example of mercury, against stationary electrodes whereby intermittent electric connections are established in accordance with the electric converter operations. The mercury of these jets is sucked from a mercury pool provided in the bottom of a closed vessel, said mercury pool being constantly replenished by the mercury returning from the jets.

It is frequently necessary to provide switches with these apparatus to connect and disconnect an external circuit, particularly a direct current circuit. For example, it may be desirable to operate such switches during the starting or stopping of the motor pump of the mercury jets, because electric connections might be established during such starting or stopping of the motor pump, which do not satisfy the conditions for the proper operation of an electric converter. This will endanger the apparatus connected with the converter or the converter itself.

It is an object of the present invention to provide in an electric contacting device operating with the aid of rotating liquid jets a switching means which is adapted to interrupt or continue the feed of the conductive liquid independently of the rotation of the feed mechanism.

It is a further object of the invention to exclude mechanical actuating devices from such switching means as such devices may impair the gas tight condition of the vessel. The new switching means may be used for starting or stopping of a liquid jet converter or in a vessel of an electric switch operating by means of rotating conductive liquid jets.

Examples of the invention are shown in the drawing in which.

Figure 1:
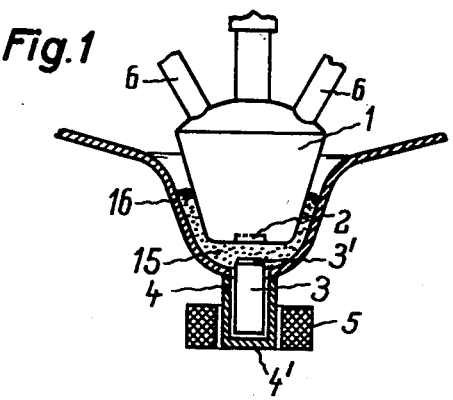
Fig. 1 is a longitudinal section through a part of the apparatus according to the invention.

In Fig. 1, a lower dished portion of the vessel of the apparatus containing the conductive liquid 15, i. e. the mercury is indicated at 16. A pump, such as a centrifugal pump 1 is partially immersed in the mercury 15. This pump has a plurality of tube elements 6 from which the mercury is discharged and thrown against stationary electrodes, when the pump is rotated. These tube elements are illustrated broken off in Fig. 1, i. e., their upper ends from which the mercury is ejected are not shown. In the same way, the electrodes, the motor driving the pump, the mounting of this motor, and the upper and main part of the vessel of the apparatus are not illustrated in the drawing. As to these details reference is made to the co-pending application of one of the present inventors entitled "An Electric Current Pulsating Means," Ser. No. 491,120, filed February 28, 1955. Any other construction of the pump and apparatus as that shown in this co-pending application may be used.

The pump 1 has an opening at its bottom, through which the mercury is sucked when the pump is rotating, said opening being provided with a valve seat 2 adapted to cooperate with the head 3' of a valve pin 3. The seat 2 and the head 3' are slightly conically shaped and the head 3' when pressed on the seat 2 closes the suction opening of the pump 1 thereby interrupting its operation. The valve pin 3 is surrounded and guided by a cylindrical bottom portion or extension 4 of the dished portion 16 of the apparatus vessel, the bottom of said extension being closed by a wall 4'. The upper end of the extension 4 opens to the dished portion 16, i. e. the extension 4 is also filled with mercury. The extension 4 consists of non-magnetic material, while the valve pin 3 is made, at least partially, of magnetic material so that an electric coil 5 surrounding the lower part of the extension 4, when energized, will attract the valve pin 3 and withdraw its head 3' from the seat 2 of the suction opening of the pump 1. When the coil 5 is not energized, the valve pin 3 acting as a float on the mercury firmly presses its head 3' on the seat 2 of the suction opening of the pump 1. Only parts of the body of the valve pin 3 which is preferably cylindrical and has a slightly smaller diameter than the inner diameter of the extension 4 are to be made of magnetic material, such as iron, in accordance with the magnetic requirements. To increase the lifting action of the floating valve pin 3, when the coil 5 is deenergized, the valve pin 3 can be made of a material of a light specific weight and/or may be made as a hollow body.

Figure 2:
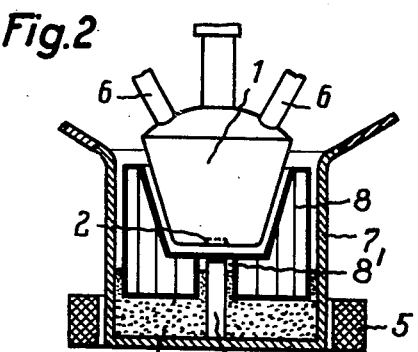
Figs. 2 and 3 show two further embodiments of the invention illustrated in the same manner as in Fig. 1.

According to another embodiment of this invention shown in Fig. 2, the liquid flow to the centrifugal mercury pump is controlled by lowering or raising the mercury of the pump by means of a displacement body acted upon by an electromagnet.

The centrifugal pump 1 in Fig. 2 and other parts of the apparatus are principally the same as in Fig. 1. The bottom portion of the vessel of the apparatus is formed by a cylindrical extension 7, said extension being closed at its bottom by a wall 7', while its top opens to the apparatus vessel. The extension 7 made of non-magnetic material is surrounded close to its bottom by an electrical coil 5. A displacement body 8 of suitable shape, made for example of iron and preferably hollow is adapted to float on the mercury 15 in the extension 7, said displacement body 8 being guided along and by a central guide post or pin 14 mounted on the bottom wall 7' and standing vertically thereon. The displacement body 8 has a form which fills out to a great extent the space between the centrifugal pump 1 and the cylindrical extension 7, whereby the guide post or pin 14, is located in a central opening 8' vertically provided in the body 8.

The cylindrical extension 8 is filled with mercury to such an extent that the mercury level is higher than the suction opening at 2 of the pump 1 when the body 8 is lowered under the electro-magnetic action of the current flowing in the coil 5 and the mercury is correspondingly displaced. The pump 1 can now operate. When the coil 5 is deenergized, the displacement body 8 rises and the mercury level drops below the suction opening of the pump 1 thereby interrupting its operation.

Figure 3:
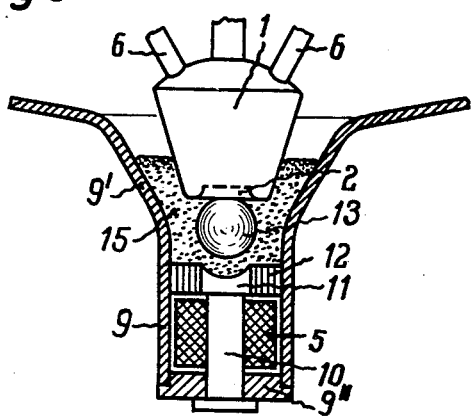

In the embodiment of the present invention shown in Fig. 3, the action of the switch is still more improved, i. e., the switch will have a very short time of actuation.

The lower part of the apparatus vessel in Fig. 3 is extended by a cylindrical portion 9 joining the vessel by means of a frusto-conical intermediate section 9'. The bottom of the cylindrical portion or extension 9 is closed by means of a plug or bottom member 9" preferably threaded in the lower end of this extension 9. A magnetic or iron core 10 having a head in form of a magnetic pole shoe 11 is centrally mounted on the bottom member 9" and projects vertically into the cylindrical portion 9. A magnetically and electrically insulating ring or washer 12 surrounding the pole shoe 11 and filling the space between the latter and the cylindrical extension 9 seals gas-tightly the space below the ring or washer 12, said space being occupied by the electric coil 5 mounted on the core 10. The chamber above the washer 12 and the pole shoe 11 is filled with mercury 15 into which the pump 1 immerses in a similar manner as in Fig. 1. A floating ball 13 made partially or entirely of magnetic material acts as valve member for the seat 2 of the suction opening of the pump 1. The ball 13 may be made hollow to increase its lifting action. The cylindrical extension 9 and its bottom member 9" are made of magnetizable material so as to form a magnetic return.

When the coil 5 is energized, the ball 13 will be immediately attracted by the pole shoe 11 under the action of the magnetic lines of force produced by this energization, i. e., the ball 13 will be kept from the seat 2 which it normally occupies. Thus, the suction opening of the pump 1 is uncovered and the pump can operate. When the coil 5 is deenergized, the light ball 13 instantly rises and engages the seat 2 of the suction opening of the pump 1, thereby closing the same and shutting off the feed of mercury to the pump 1.

A second electric coil may be arranged in the embodiments of the invention shown to cause and/or assist the upward movements of the valve or displacement members, when this second coil is energized by an electric current.

While in the foregoing embodiments of this invention the magnetic floating body is specifically lighter than the mercury, it is possible to use magnetic bodies of higher specific weight than mercury in the new apparatus. In this case, these bodies would sink in the mercury due to their higher weight when a lifting coil which would have to be provided for them is deenergized. The operations of such modified apparatus with respect to the covering and uncovering of the suction opening of the pump are the same as those described in connection with Figs. 1 to 3, inclusive. Springs or the like means may be employed to return the bodies to the closing positions rather than providing electro-magnetic coils for this purpose.

While specific embodiments of the invention have been shown and described in the foregoing, we do not limit ourselves to the exact details of construction set forth, and this invention embraces such changes, modifications and equivalents of the parts and their formation and arrangement as come within the purview of the appended claims.

We claim:

1. In an electric current pulsing apparatus of the type in which a centrifugal pump is adapted to throw a conductive liquid jet against stationary contact members, said pump having a suction opening for said conductive liquid, means at said opening to interrupt the flow of said conductive liquid to said pump independently from the rotation of said pump.

2. In an electric current pulsing apparatus of the type in which a centrifugal pump is adapted to throw a conductive liquid jet against stationary contact members, a vessel having a sump filled with said conductive liquid, said pump having a lower suction opening for said liquid immersible therein, and means to cover and uncover said opening independently of the rotation of said pump.

3. In an electric current pulsing apparatus according to claim 2, wherein said means to cover and uncover said suction opening is an electro-magnetically controllable valve.

4. In an electric current pulsing apparatus according to claim 2, wherein a substantially vertically movable valve member immersed in said conductive liquid is provided to seat on said suction opening to interrupt the flow of said liquid from said sump to said pump, and wherein means to unseat said valve member from said suction opening by vertical displacement of said valve member are provided to admit said liquid to said pump.

5. In an electric current pulsing apparatus according to claim 4, wherein said movable valve member is specifically lighter than said conductive liquid, so that said member will firmly seat on said suction opening due to its buoyancy in said liquid.

6. In an electric current pulsing apparatus according to claim 4, wherein said movable valve member is magnetizable, and wherein at least one electric coil is provided adapted upon energization by an electric current to attract said movable valve member and withdraw it from said suction opening.

7. In an electric current pulsing apparatus according to claim 6, wherein said movable valve member is guided by and in a relatively narrow lower extension of the apparatus vessel, said extension being filled with said conductive liquid and being made of non-magnetic material, and wherein said electric coil surrounds said extension.

8. In an electric current pulsing apparatus according to claim 2, a substantially vertically movable displacement body partially immersed in said conductive liquid, and means to move said body downwardly to raise by displacement of said liquid its level to at least said suction opening and to move said body upwardly to lower said liquid level below said suction opening.

9. In an electric current pulsing apparatus according to claim 8, wherein said displacement body is made at least partially of magnetizable material, and wherein at least one electric coil is provided which is adapted upon energization by an electric current to attract said body to move it downwardly.

10. In an electric current pulsing apparatus according to claim 9, wherein said displacement body is specifically lighter than said conductive liquid, so that said body will move upwardly upon deenergization of said coil.

References Cited in the file of this patent

UNITED STATES PATENTS

| | | |
|---|---|---|
| 625,921 | Boas | May 30, 1899 |
| 895,044 | Rothenstein | Aug. 4, 1908 |
| 1,531,007 | Jackson | Mar. 24, 1925 |
| 1,713,234 | Litle | May 14, 1929 |
| 1,757,059 | Rickenberg | May 6, 1930 |
| 2,056,322 | Hoppe | Oct. 6, 1936 |
| 2,444,687 | Widakowich | July 6, 1948 |